United States Patent Office 2,789,079
Patented Apr. 16, 1957

2,789,079

ORALLY ADMINISTRABLE DRY THERAPEUTIC COMPOSITION

Edward A. H. King, Port Washington, N. Y., assignor to Crookes Laboratories, Inc., Mineola, N. Y., a corporation of New York No Drawing. Application March 16, 1953, Serial No. 342,741

6 Claims. (Cl. 167—65)

The present invention relates to a pharmaceutical product for the relaxation of muscular spasms and for the relief of pain in the treatment of rheumatic conditions.

Mephenesin (3-O-toloxy-1, 2-propanediol) has been used to exert a specific corrective effect in minimizing or abolishing skeletal muscle spasm. However, mephenesin dissolves to the extent of less than 2% in water or in N/10 hydrochloric acid, which is approximately the acidity of the gastric contents. Therefore, the low solubility of mephenesin in the stomach limits its therapeutic efficiency, even when administered orally in large doses. Moreover, due to the bulky nature of mephenesin, the size of the tablets necessary to contain operative amounts of this product would have to be large, or the number of tablets to be administered for one dosage must be comparatively large.

In accordance with the present invention, it is proposed to supplement the muscle relaxing action of oral mephenesin with the actual pain-relieving action of a salicylate which is soluble and which manifests no toxic reaction. The salicylate suitable for that purpose is sodium salicylate, potassium salicylate and ammonium salicylate, although sodium salicylate is preferred. It has been found that this salicylate acts in conjunction with the mephenesin, not only as a specific for the pains resulting from rheumatic condition, but also as a solubilizing agent for the mephenesin, causing it in the presence of the salicylate to become easily and quickly dissolved in the stomach. For example, a mixture of equal parts of mephenesin and sodium salicylate, renders the mephenesin infinitely soluble in water, in N/10 hydrochloric acid (corresponding to the acidity of gastric contents) or in dilute alkaline solution of pH similar to that of the upper intestinal tract. Hence, when this mixture is orally administered, it will dissolve rapidly, and so that a therapeutic concentration can be easily and rapidly achieved.

This cannot be readily accomplished with mephenesin alone since this drug is only slightly soluble and the small amounts of mephenesin which are dissolved and assimiliated are rapidly metabolized and eliminated before a full therapeutic effect can be secured.

As a specific example of the invention, the mixture of mephenesin and sodium salicylate powders in equal parts by weight are compressed into tablets or filled into capsules suitable for oral administration. More specifically, each tablet may be made up to contain 125 mg. of mephenesin and 125 mg. of sodium salicylate. A dosage of two or more of such tablets is sufficient to achieve rapid therapeutic concentration, or capsules containing 250 mg. of each drug may be employed.

While the invention has been described with particular reference to a specific embodiment, it is to be understood that it is not to be limited thereto but is to be construed broadly and restricted solely by the scope of the appended claims.

What is claimed is:

1. An orally administrable dry therapeutic composition comprising a mixture of equal parts by weight of mephenesin and a salicylate selected from the class consisting of sodium, potassium and ammonium salicylates.

2. A composition according to claim 1, wherein the composition is in the form of a tablet.

3. A composition according to claim 1, wherein the composition is in the form of a powder.

4. An orally administrable dry therapeutic composition comprising a mixture of equal parts by weight of mephenesin and sodium salicylate.

5. A composition according to claim 4, wherein the composition is in the form of a tablet.

6. A composition according to claim 4, wherein the composition is in the form of a powder.

References Cited in the file of this patent

UNITED STATES PATENTS

| 868,204 | Mendel | Oct. 15, 1907 |
| 1,477,691 | Callsen | Dec. 18, 1923 |
| 2,319,094 | Truebe | May 11, 1943 |
| 2,433,765 | Krantz | Dec. 30, 1947 |

FOREIGN PATENTS

| 9,013 | Great Britain | of 1890 |
| 289,950 | Germany | Jan. 26, 1916 |
| 614,018 | Great Britain | Dec. 8, 1948 |
| 800,876 | Germany | Dec. 11, 1950 |

OTHER REFERENCES

Unlisted Drugs, vol. 4, No. 10, p. 148.
McKee: Industrial and Engineering Chemistry, vol. 38, No. 4, April 1946, p. 382.
Unlisted Drugs, vol. 4, No. 11, November 30, 1952, pp. 158, 162.